No. 830,381. PATENTED SEPT. 4, 1906.
E. M. STREETER.
TRAP.
APPLICATION FILED APR. 17, 1906.
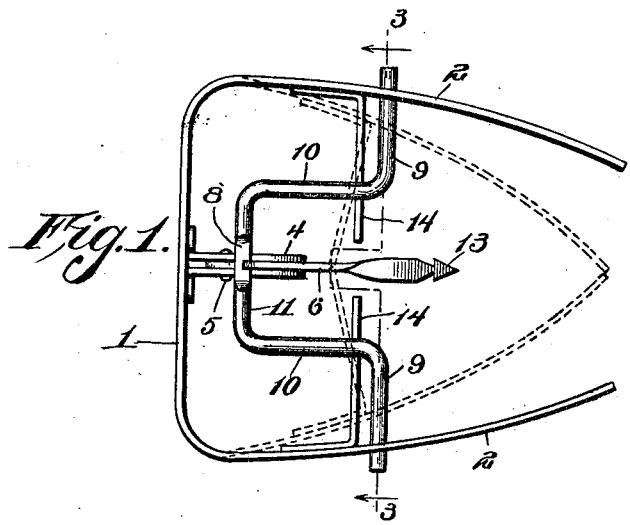
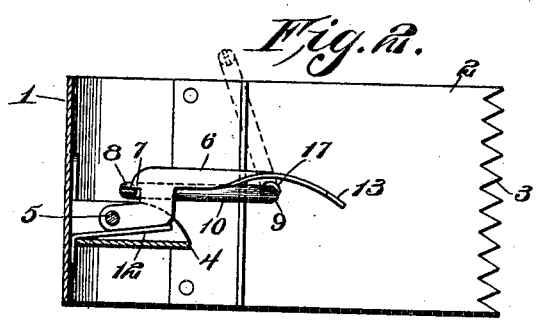
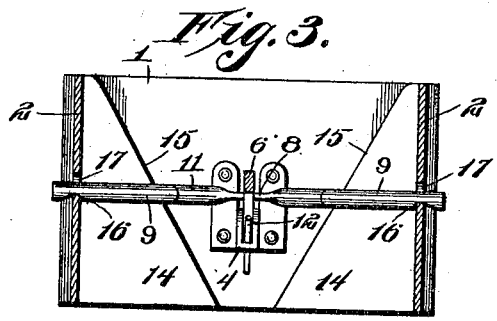
Witnesses
Louis R. Heinrichs.
P. M. Smith.
Inventor
Egbert M. Streeter
By Victor J. Evans
Attorney
THE NORRIS PETERS CO., WASHINGTON, D. C.

UNITED STATES PATENT OFFICE.

EGBERT M. STREETER, OF TACOMA, WASHINGTON.

TRAP.

No. 830,381.  Specification of Letters Patent.  Patented Sept. 4, 1906.

Application filed April 17, 1906. Serial No. 312,217.

*To all whom it may concern:*

Be it known that I, EGBERT M. STREETER, a citizen of the United States, residing at Tacoma, in the county of Pierce and State of Washington, have invented new and useful Improvements in Traps, of which the following is a specification.

This invention relates to traps especially designed for catching rats and mice, the object of the invention being to provide a simple, cheap, and effective trap composed wholly of metal and which is practically indestructible, which may be set without danger of injuring the hands or fingers of the operator, and which will quickly kill the animal.

With the above and other objects in view the invention consists in the novel construction, combination, and arrangement of parts hereinafter more fully described, illustrated, and claimed.

In the accompanying drawings, Figure 1 is a plan view of the trap embodying the present invention, showing the same set and indicating by dotted lines the position of the parts when the trap is sprung. Fig. 2 is a vertical longitudinal section through the same. Fig. 3 is a vertical cross-section taken in line with the journal portion of the spreader.

The body of the trap is composed of a strip of spring-steel or other metal, the said strip being of any desired width and being bent to comprise a body part or connecting portion 1 and spring-arms 2, which extend to the same side of the body or connecting portion 1, as clearly shown in Fig. 1, said arms 2 having a normal tendency to move toward each other and come in contact at their outer edges or extremities, which are preferably formed with teeth 3 to impale any portion of the body of the animal with which they come in contact.

Extending inward from the body 1 is a bracket 4, to which is pivotally connected at the point 5 a trigger 6, having an engaging toe portion 7, which is adapted to engage a shoulder 8 on the central portion of a spreader in the form of a crank-shaft, the latter embodying the oppositely-extending ends or journal portions 9 and the crank portions 10, arranged at a suitable distance apart and connected by the cross-bar 11, on which the trigger 6 is held to engage the shoulder 8 on the spreader by means of a trigger-spring 12, connected with the bracket 4 and pressing upward against the trigger, as clearly shown in Fig. 2. The trigger is extended well between the spring arms or jaws 2 and is preferably provided with a barbed or arrow head 13, on which the bait is adapted to be impaled.

Extending inward from the arms or jaws 2 are oppositely-arranged wings 14, having reversely-inclined inner edges 15, which converge downwardly, as shown in Fig. 3, whereby the inclined edges of the wings are adapted to act on the crank portions 10 of the spreader to throw the crank of the spreader upward from the full-line position of Fig. 2 to the dotted-line position of the same figure, which permits the spring arms or jaws to move toward each other and to close upon the animal.

Adjacent to their outer ends the journal portions 9 of the spreader are notched to form shoulders 16, the extremities of the portions 9 passing through openings 17 in the jaws 2 and the shoulders 16 engaging against the inner faces of the jaws, so as to lock the same in a spread condition, as shown in Figs. 1 and 3.

It will be seen that as the animal depresses the forward end of the trigger the shoulder 7 of the trigger is moved out of engagement with the shoulder 8 of the spreader. This allows the crank portion of the spreader to be thrown upward quickly by the action of the reversely-inclined edges 15 of the wings 14, thereby disengaging the shoulders 16 from the jaws and allowing the jaws to snap suddenly inward and impale the animal between the teeth 3 at the extremities of the jaws.

The trap may be easily set without injuring the hands or fingers of the operator by simply rocking the crank portion of the spreader downward until the shoulder 8 snaps past the shoulder 7 and is engaged and held thereby, the bait having first been placed on the projecting end of the trigger.

I claim—

1. A trap embodying a spring-frame having oppositely-arranged spring-jaws, an oscillatory spreader having shoulders movable into and out of engagement with the jaws, and a trigger having means for holding and releasing the spreader.

2. A trap embodying a spring-frame having oppositely-arranged spring-jaws provided with openings, an oscillatory spreader having journal portions fitted in said openings and provided with shoulders movable into and out of engagement with the jaws, and a trigger having means for holding and releasing the spreader.

3. A trap embodying a spring-frame having oppositely-arranged spring-jaws, an oscillatory spreader having shoulders movable into and out of engagement with the jaws, a trigger having means for holding and releasing the spreader, and means on one of the jaws for swinging the spreader to move the shoulders of the latter out of engagement with said jaws.

4. A trap embodying a spring-frame having oppositely-arranged spring-jaws, wings extending inward from the jaws and provided with reversely-inclined working edges, a spreader having journal portions fitted to the jaws and a crank portion operated upon by the wings, and a trigger having means for holding and releasing the crank portion of the spreader.

5. A trap embodying a spring-frame having oppositely-arranged spring-jaws provided with openings, a spreader embodying journal portions inserted through said openings in the jaws, a crank portion, and a connecting portion having a shoulder, means on the frame for engaging and swinging the crank portion of the spreader, and a spring-sustained trigger having means adapted to engage and release the shoulder on the connecting portion of the spreader.

In testimony whereof I affix my signature in presence of two witnesses.

EGBERT M. STREETER.

Witnesses:
CHARLES N. JOLES,
A. H. EATON.